July 16, 1935.　　　D. H. McGOGY　　　2,008,623
FLUID METER
Filed March 27, 1933　　　5 Sheets-Sheet 1
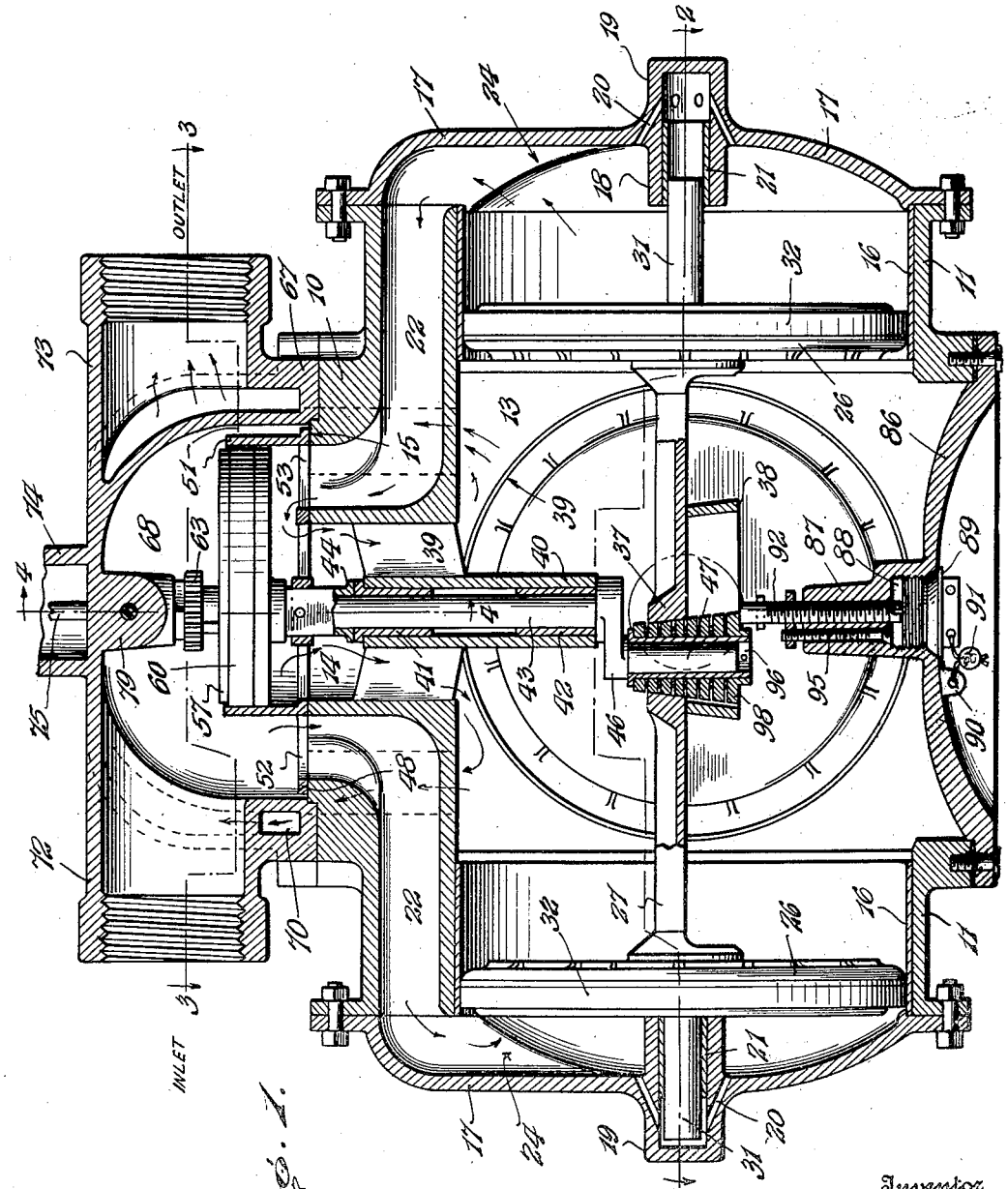
Inventor
D. H. McGogy.
By Lacy&Lacy,
Attorneys July 16, 1935. D. H. McGOGY 2,008,623
FLUID METER
Filed March 27, 1933 5 Sheets—Sheet 2
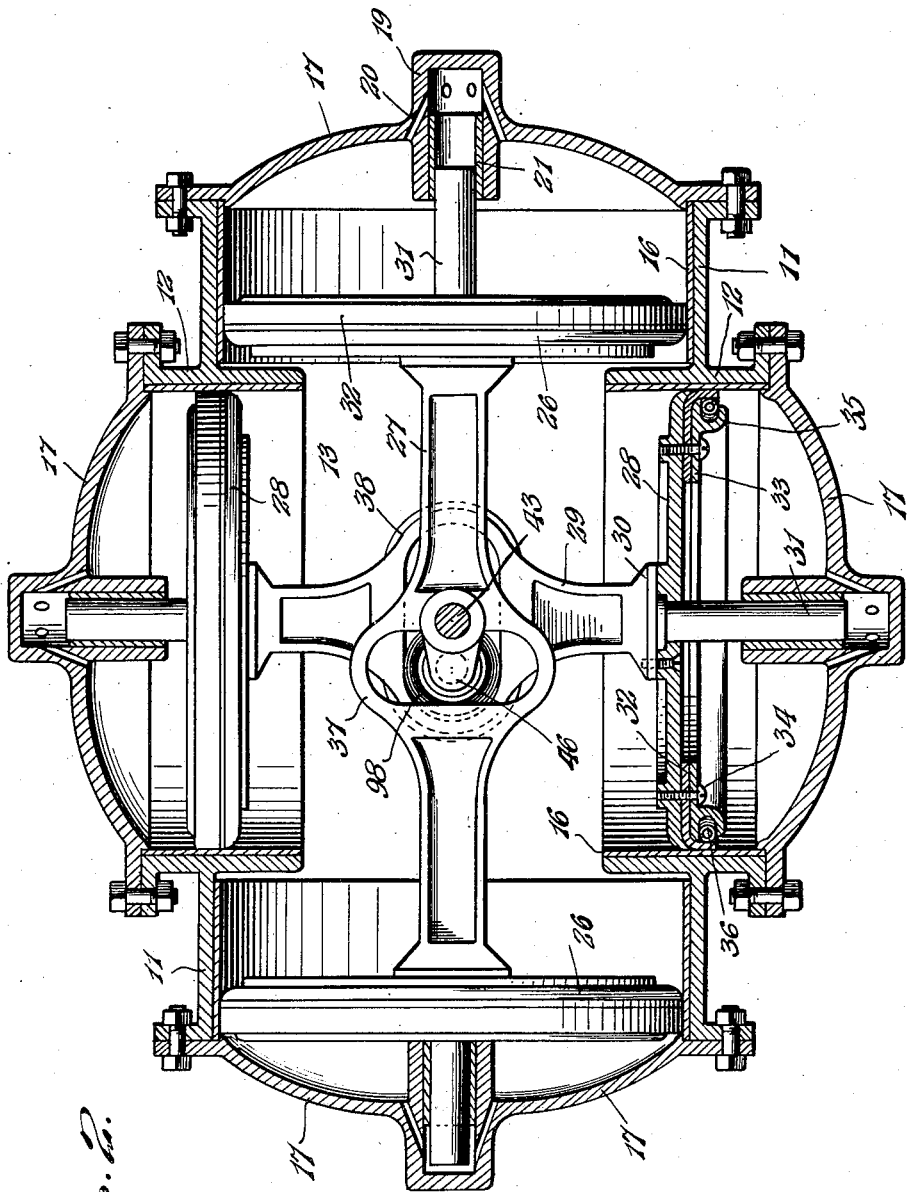

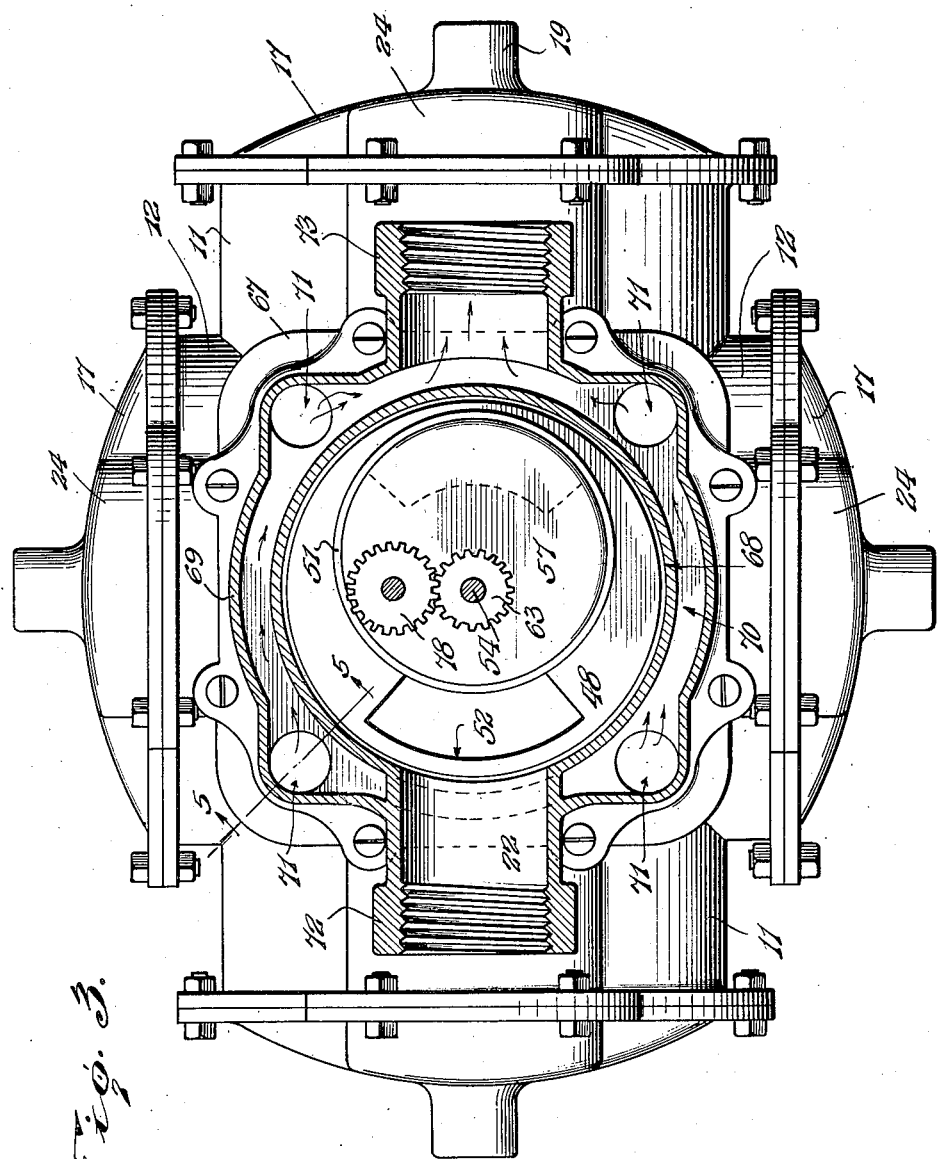

July 16, 1935.　　　　D. H. McGOGY　　　　2,008,623
FLUID METER
Filed March 27, 1933　　　5 Sheets-Sheet 4
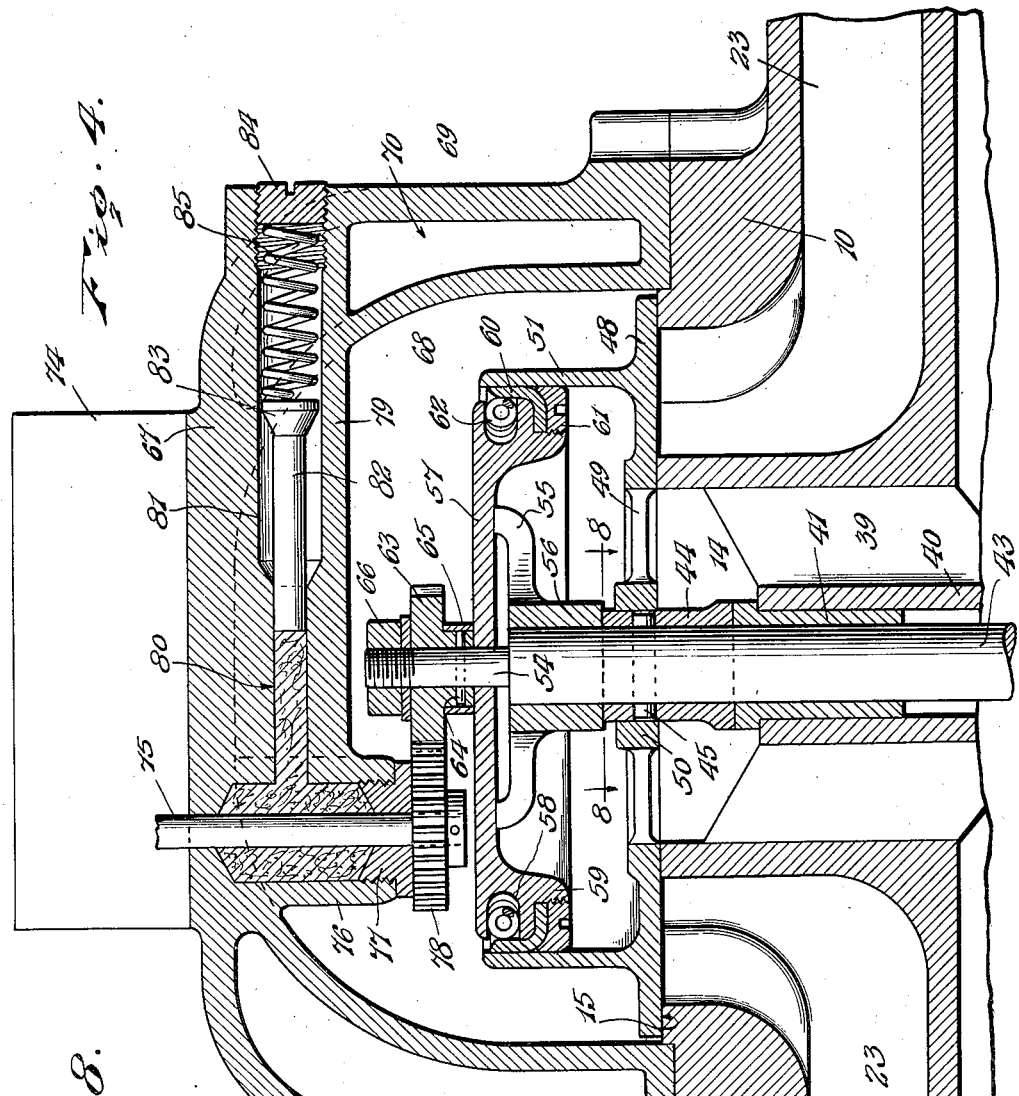
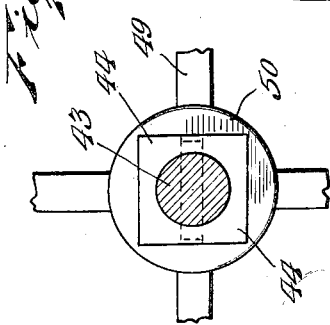
Inventor
D. H. McGogy.
By Lacey & Lacey,
Attorneys July 16, 1935.  D. H. McGOGY  2,008,623
FLUID METER
Filed March 27, 1933  5 Sheets-Sheet 5
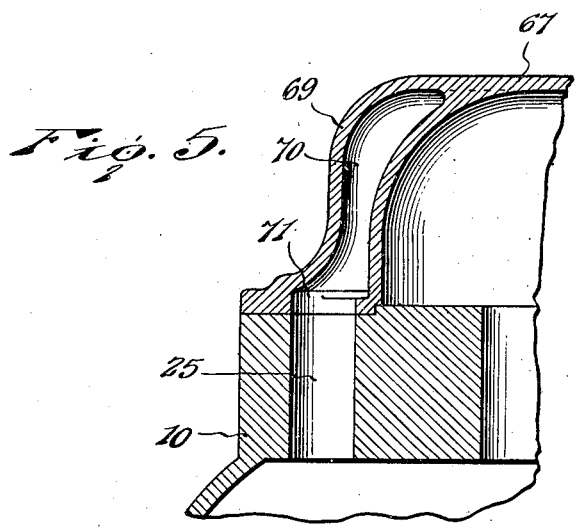
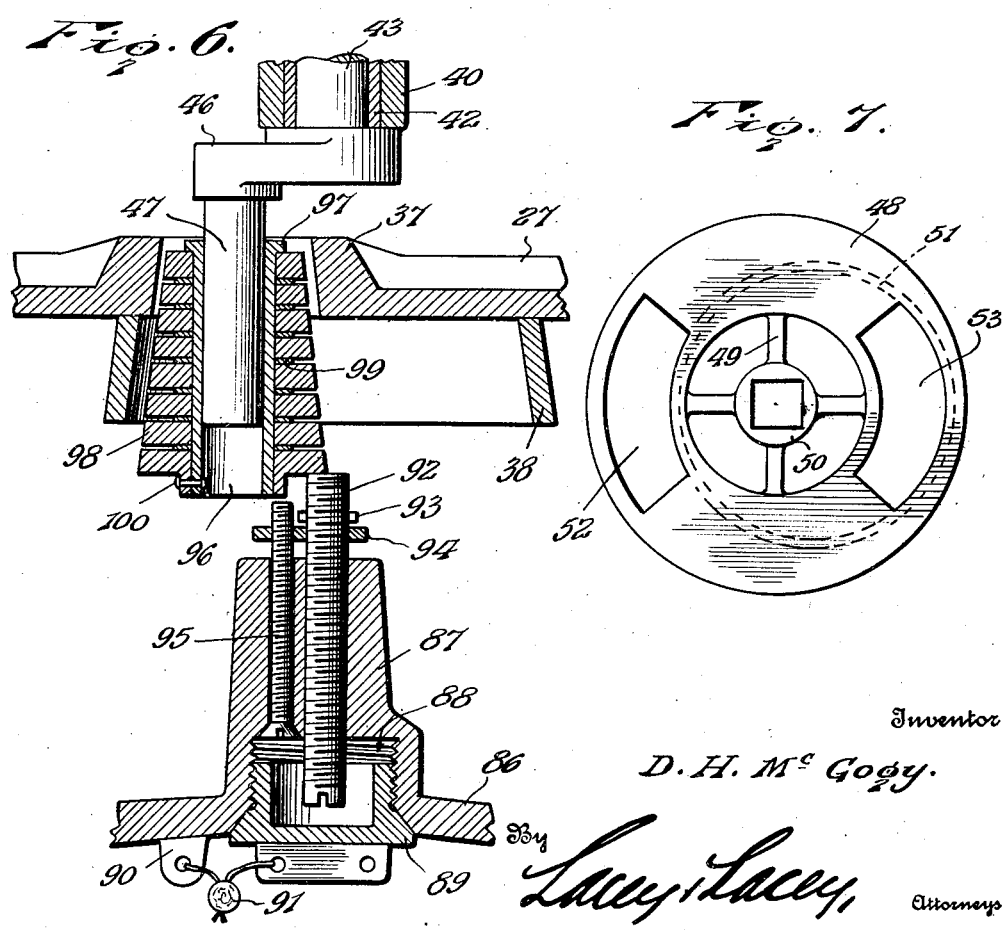
Inventor
D. H. McGogy.
By Lacey & Lacey,
Attorneys Patented July 16, 1935

2,008,623

UNITED STATES PATENT OFFICE 2,008,623

FLUID METER

Donald H. McGogy, McMinnville, Oreg.

Application March 27, 1933, Serial No. 663,068

7 Claims. (Cl. 74—50)

This invention relates to an improved fluid meter and is of the general character shown in my prior Patents Nos. 1,694,747, dated December 11, 1928, 1,814,725, dated July 14, 1931, and 1,893,429, dated January 3, 1933.

The invention seeks, among other objects, to provide a meter embodying pistons driven by the fluid being measured and a crank shaft for operating a counter or registering mechanism and wherein controlled slack motion may be introduced in the connection between the pistons and the crank pin of said shaft for varying the throw of the pistons and, consequently, varying the volume of the meter.

The invention seeks, as a further object, to provide a novel means for introducing the slack motion in the connection between the pistons and the crank pin and wherein such means will not only be sensitive in adjustment but also accurate so that the meter may be set to a nicety.

Another object of the invention is to provide a meter wherein the inlet and outlet will both be located in the meter head to thus provide a well-balanced device.

A further object of the invention in this connection is to provide a device wherein the body of the meter may be readily detached from the head so that, when the head is once connected in a pipe line, the body of the meter may be disconnected from the head to permit of inspection or repair without the necessity of disturbing the line.

And the invention seeks, as a still further object, to provide a meter which, as compared with my prior devices, will be more compact.

Other and incidental objects, not specifically mentioned in the foregoing, will be apparent during the course of the following description.

In the accompanying drawings forming part of this specification,

Figure 1 is a vertical sectional view through my improved meter,

Figure 2 is a horizontal section on the line 2—2 of Figure 1,

Figure 3 is a horizontal section on the line 3—3 of Figure 1,

Figure 4 is a fragmentary vertical section on the line 4—4 of Figure 1, being on an enlarged scale, Figure 5 is a detail section on the line 5—5 of Figure 3, Figure 6 is an enlarged detail section particularly showing the roller employed for introducing slack motion between the yokes of the pistons and the crank pin of the crank shaft employed for driving the counter mechanism, Figure 7 is a plan view of the control valve, and Figure 8 is a detail section on the line 8—8 of Figure 4.

In carrying the invention into effect, I employ a meter body 10 from which radiate quadrantly spaced cylinders, the oppositely disposed cylinders of one pair being indicated at 11 and the oppositely disposed cylinders of the other pair being indicated at 12. As particularly seen in Figure 2, the axes of the pair of cylinders 12 intersect the axes of the pair of cylinders 11, the cylinders 12 being thus arranged closer to each other for correspondingly reducing the outside dimensions of the device as a whole. At their inner ends, the cylinders all open into a central chamber 13 provided within the body 10, and entering the chamber through the upper side of the body is a passage 14 surrounding the upper end of which is an annular valve seat 15.

The cylinders 11 and 12 are preferably equipped with liners 16, and closing the cylinders, at their outer ends, are end caps 17 bolted or otherwise secured to said cylinders. These caps are provided axially of the cylinders with bearings 18 closed at their outer ends with bosses 19 on the end caps, and leading from the interior of said bosses are passages 20 opening through the inner faces of the end caps so as to obviate the entrapping of liquid within the bosses. Fixed within the bearings 18 are bushings 21.

Formed through the thickened upper wall of the body 10 to communicate with the outer ends of the pair of cylinders 11 are, as particularly seen in Figure 1, a pair of oppositely disposed passages 22 opening through the valve seat 15 at diametric points, and arranged at right angles to the pair of passages 22, as particularly seen in Figure 4, is a like pair of oppositely disposed passages 23 communicating with the outer ends of the pair of cylinders 12 and opening through the valve seat 15 at points equally spaced with respect to the passages 22. As shown in Figure 1, the end caps 17 are provided at the lower ends of all of the passages with ducts 24 to facilitate the free flow of liquid into and out of the cylinders through the passages. Formed through the upper thickened wall of the body 10, at the angles between the pairs of cylinders, as particularly shown in Figures 3 and 5, are discharge passages 25 communicating with the central chamber 13 of the body.

Slidable in the pair of cylinders 11, as particularly shown in Figure 2, are pistons 26 rigidly coupled by a connecting rod 27 and slidable in the pair of cylinders 12 are pistons 28 rigidly coupled by a connecting rod 29. Formed on the connecting rods 27 and 29 are shoulders 30 from which extend tail rods 31 slidable in the bushings 21 of the bearings 18 for supporting and guiding the pistons in their sliding movement within the cylinders. The pistons are all alike and comprise end plates which are detachably screwed to the shoulders 30 of the connecting rods and carry leathers 32. Overlying the leathers are clamping rings 33 secured to the end plates of the pistons by screws 34. The outer margins of the leathers are free to contact the cylinder liners 16, and formed in the rings 33 are annular channels 35 in which is freely disposed a helical coiled expansion ring 36 holding said margins of the leathers in engagement with said liners. Midway between its ends, the connecting rod 27 is provided with a transverse yoke 37 and formed on the connecting rod 29, at right angles to the yoke 37, is a like yoke 38. As particularly brought out in Figure 6, the slots of these yokes are provided with downwardly diverging inclined side walls.

Arranged within the passage 14, as particularly seen in Figures 1 and 4, is a spider 39 which supports a vertically disposed bearing 40 axially of the body 10 and, as will be noted, this bearing is elongated to extend downwardly a considerable distance within the central chamber 13 of the body. Fitting within the bearing, at its upper end, is an end thrust bushing 41 while within the lower end of the bearing is arranged a bushing 42 and journaled through said bushings is a shaft 43. Surrounding the upper end portion of the shaft to rest against the bushing 41 is a collar 44 detachably connected to the shaft by a pin 45. As shown in detail in Figure 8, this collar is externally squared and, as will be appreciated, the collar will coact with the bushing 41 for sustaining any downward thrust upon the shaft. Fixed to the lower end of the shaft is a crank 46 which carries at its free end a depending crank pin 47 projecting through the yokes 37 and 38 of the connecting rods 27 and 29.

Resting flat upon the valve seat 15 is an annular rotatable control valve 48. As best seen in Figures 4 and 7, this valve is provided centrally with a spider 49 which overlies the passage 14 through the upper thickened wall of the body 10 and is of a diameter corresponding to the diameter of said passage. The spider is provided with a hub 50 which is squared to removably fit over the collar 44 so that the valve is thus connected to the shaft 43 to be rotated thereby. Rising from the valve is an annular eccentric flange 51 and formed through the valve, at one side thereof externally of said flange, is an external port 52, while, at its opposite side, the valve is provided within the flange with an internal port 53.

At its upper end, the shaft 43 is provided with an axial stud 54 and mounted upon the upper end portion of the shaft is a spider 55 having a hub 56 fitting the shaft and very slightly loose thereon. The spider 55 carries a piston including a head 57 which fits over the stud 54 to rest upon the spider, and formed in the periphery of the head is an annular channel 58 adjacent which is a depending flange 59. Overlying the channel is a leather 60 secured by a clamping ring 61 screwed upon the flange 59, and disposed within the channel 58 is a helical coiled expansion ring 62 pressing the free margin of the leather 60 into contact with the flange 51 of the valve 48. A tight joint is thus provided between the piston and the valve and the piston will rotate with the valve. Fitting the stud 54 to rest upon the piston head 57 is a pinion 63 connected with the stud by a pin 64 and surrounding the hub of the pinion is a split removable collar 65 holding the pin against endwise displacement. Screwed upon the upper end of the stud is a nut 66 securing the parts in assembled relation.

Fitting the body 10 at its upper side is a removable head 67 which, as seen in Figure 3, is preferably bolted to the body. This head, as particularly seen in Figure 4, is provided with an internal dome-shaped chamber 68 which houses the valve 48 and associated parts, and formed on the head to surround said chamber is a manifold 69 providing a passage 70. Formed through the bottom wall of the head, at the corners thereof, as particularly seen in Figure 3, are ports 71, which, as brought out in Figure 5, register with the passages 25. These ports thus establish communication between the central chamber 13 of the body and the manifold passage 70 of the head. Formed on the head, at one side thereof, to extend through the manifold 69 into the chamber 68, as seen in Figure 3, is an inlet 72 and extending from the head, at its opposite side, is a diametrically disposed outlet 73 communicating with the passage 70 of the manifold.

Rising from the head are spaced flanges 74 to accommodate a suitable counter or registering mechanism and journaled through the head, between said flanges, is a shaft 75 for driving said mechanism. Surrounding the lower end portion of the shaft is a gland 76 closed by a gland nut 77, and fixed upon the lower terminal of the shaft is a pinion 78 meshing with the pinion 63 so that as the shaft 43 is rotated, the shaft 75 will be turned thereby for actuating the counter or registering mechanism. At one side of the gland 76 the head is formed with an internal tubular boss 79 opening through the manifold 69 at the exterior of the head. At its inner end portion, this boss provides a duct 80 communicating with the gland 76 while, at the outer end portion of the boss is an enlarged chamber 81. The gland 76 as well as the duct 80 is filled with a suitable lubricating packing, and slidably fitting in said duct for feeding the packing into the gland is a plunger 82 provided at its outer end with a head 83 accommodated in the chamber 81. Closing the chamber at its outer end is a plug 84 and interposed between the plug and the head 83 of the plunger is a spring 85 urging the plunger forwardly to act on the packing. Thus, the shaft 75 will be effectively lubricated at all times.

Closing the central chamber 13 at the lower side of the body is a concavo-convex bottom plate 86 provided centrally with an upstanding boss 87 recessed at its lower end to provide a chamber 88, and normally closing said chamber is a hollow plug 89. The plate 86 is provided with an adjacent lug 90 and normally connecting the plug with said lug is a seal 91 for preventing unauthorized removal of the plug.

Extending through the boss 87, as particularly shown in Figure 6, is a vertically disposed adjusting screw 92 which is axially alined with the shaft 43. The lower end of this screw is housed within the chamber 88 and normally concealed by the plug 89 while, near its upper end, the screw carries a stop pin 93 for limiting its downward movement. The upper end portion of the screw 92 carries a clamping plate 94 with which the screw has threaded engagement and extending freely through the boss 87 but threaded through the plate is a clamping screw 95 the head of which is housed within the chamber 88. Thus, as will be seen, by removing the plug 89 and loosening the screw 95, the screw 92 may be adjusted either upwardly or downwardly when, by tightening the screw 95, the plate 94 may be canted for locking the screw 92 in adjusted position.

Supported by the screw 92 is a bearing roller for introducing slack motion between the crank pin 47 of the shaft 43 and the yokes 37 and 38 of the connecting rods 27 and 29. As particularly illustrated in Figure 6, this roller includes a sleeve 96 which rotatably fits the pin 47 and is provided at its upper end with a flange 97. Rotatably fitting about the sleeve are a number of metal roller disks 98 and spacing the disks apart are washers 99. The lowermost disk is provided with a depending collar, and extending through said collar and through the sleeve 96 are one or more fastening elements 100 securing the parts in assembled relation. As will be observed, the disks are of graduated diameter increasing from the uppermost disk to the lowermost disk and, as is to be particularly noted, this lowermost disk rests at its periphery upon the upper end of the adjusting screw 92. The screw will thus support the bearing roller upon the crank pin 47 to coact with the yokes 37 and 38, and attention is directed to the fact that the lowermost disk of the roller is of the same radius as the crank 46. Consequently, the lowermost disk will, as the crank pin 47 revolves about the axis of the shaft 43, remain constantly engaged with the upper end of the screw 92 so that said screw will, at all times, properly support the bearing roller. The disks 98 of the bearing roller are all beveled at their peripheries to conform to the inclination of the walls of the slots of the yokes 37 and 38 and, as the disks are mounted for independent rotation on the sleeve 96, the disks engaged with the yoke 37 may turn in one direction while those of the disks engaged with the yoke 38 may turn in the opposite direction without interfering with the former disks.

Assuming the parts to be in the position shown in Figure 1, it will be seen that liquid entering in the inlet 72 will flow through the port 52 of the valve 48 and thence downwardly through the passage 22 at the left to enter behind the piston 26 at the left for driving both of the pistons 26 to the right. Liquid behind the piston 26 at the right will, accordingly, be forced out through the passage 22 at the right and through the port 53 of the valve to enter the pasage 14 whence the liquid will flow into the central chamber 13 of the meter. From this chamber 13, the liquid will then be forced upwardly through the discharge passages 25 to enter the manifold passage 70 of the head 67 through the ports 71. From the passage 70, the liquid will then flow out through the outlet 73. Movement of the pistons 26 to the right will, as will be presently described, rotate the valve 48 to bring the ports thereof in register with the passages 23, when the fluid will act on one of the pistons 28. As will be readily perceived, the operation is such that the valve will function to admit liquid behind one piston of each pair, progressively, and at the same time permit the expulsion of liquid from behind the other piston of each pair, progressively, into the central chamber 13 of the meter so that the pair of pistons 26 will be shifted first in one direction and then in the other, as will also the pair of pistons 28.

At this point, it is to be noted that the major portion of the weight of liquid in the chamber 68 of the head 67 will be sustained by the piston head 57 and as the valve 48 is free with respect to the shaft 43 as regards vertical movement, the valve will thus be relieved of this weight. Consequently, the valve will not be unduly pressed against the valve seat 15. Furthermore, it is to be noted that all of the liquid entering the meter is subsequently expelled in to the central chamber 13 of the meter body 10 whence, as just previously described, the liquid flows out through the manifold passage 70 and outlet 73. In thus arranging the inlet of the meter as well as the outlet thereof on the meter head, it has been found that a much better balanced device is provided. This construction is also of advantage in that the body 10 of the meter may be detached from the head, leaving the head connected in a pipe line engaged with the inlet 72 and outlet 73. Thus, should inspection or repair become necessary, the body may be detached without disturbing the pipe line. A further advantage lies in the fact that, in providing the inlet and outlet upon the meter head, a more compact device is had and, in the present construction, this feature of compactness is further accentuated by forming the pair of cylinders 12 to project within the lines of the pair of cylinders 11.

When the pairs of pistons 26 and 28 are reciprocated by the action of liquid being measured, as just previously described, the yokes 37 and 38 of the connecting rods 27 and 29 will act on the disks 98 of the bearing roller of the crank pin 47, as will be readily appreciated, for turning the crank and rotating the shaft 43. This shaft will thus be driven by the reciprocation of the pistons for not only rotating the valve 48 but also, as previously explained, rotating the shaft 75 and thus actuating the counter mechanism. Figure 1 of the drawings shows the bearing roller supported by the screw 92 at the maximum elevation of the bearing roller. In this position of the bearing roller, the upper end portion thereof fits snugly within the slot of the yoke 37 while the lower end portion of the roller fits snugly within the slot of the yoke 38 so that no slack motion can occur between the yokes and said roller. As the pairs of pistons are rigidly connected by the connecting rods, the throw of the pistons in this uppermost position of the bearing roller will accordingly be limited to the effective length of the crank 46 so that the volume of the meter will be at a minimum.

By adjusting the screw 92 downwardly, however, the bearing roller will be allowed to drop and in Figure 6 I have shown the roller adjusted to a lowered position. In this lowered position of the bearing roller, it will be seen that the peripheries of the disks 98 have been caused to recede from the side walls of the slots of the yokes 37 and 38 so that the side walls of said slots are out of contact with the roller and in this connection it should be observed that the slot of the yoke 38 is somewhat wider than the slot of the yoke 37 to conform to the taper of the roller so that the clearance introduced between the upper end of the roller and the walls of the slot 37 is the same as the clearance introduced between the lower portion of the roller and the side walls of the slot 38. Thus, when the pairs of pistons are reciprocated, slack motion will be introduced between the yokes and the bearing roller. A longer travel of the pistons in both directions will thus be provided with a corresponding increase in the volume of the meter. When the screw 92 is adjusted downwardly, the bearing roller will follow the screw down by gravity while, when the screw is adjusted upwardly, the bearing roller will be correspondingly lifted. I thus provide a construction wherein a controlled slack motion is introduced into the throw of the pistons for varying the volume of the meter and tests have shown that the means employed for controlling the slack motion is not only sensitive but accurate in adjustment so that the volume of the meter may be set to a nicety.

Having thus described the invention, I claim:

1. In a meter of the character described, a rotatable shaft having a crank pin, fluid actuated pistons for rotating said shaft, a connecting rod rigidly coupling the pistons with each other and provided with a yoke, a conical bearing roller for the pin coacting with the yoke, and means for linearly adjusting said roller for introducing slack motion between the roller and yoke whereby to vary the throw of the pistons.

2. In a meter of the character described, a rotatable shaft having a crank pin, an adjusting screw axially alined with said shaft, fluid actuated pistons for rotating the shaft, a connecting rod coupling the pistons with each other and provided with a yoke, and a conical roller for said pin coacting with the yoke and supported by said screw, the screw being adjustable for shifting the roller endwise and introducing slack motion between the roller and yoke whereby to vary the throw of the pistons.

3. In a meter of the character described, a rotatable shaft having a crank pin, pairs of fluid actuated pistons for rotating said shaft, a connecting rod rigidly coupling the pistons of each pair, said rods being provided with yokes, a tapered bearing roller for the pin coacting with said yokes, and means for adjusting the roller to introduce slack motion between the roller and said yokes whereby to vary the throw of said pairs of pistons.

4. In a meter of the character described, a rotatable shaft having a crank pin, fluid actuated pistons, a connecting rod coupling the pistons, a tapered bearing roller formed of a plurality of independently rotatable roller disks mounted on the crank pin and extending through the connecting rod, and means for adjusting the roller endwise to introduce slack motion between the roller and the connecting rod whereby to vary the throw of said fluid actuated means.

5. In a meter of the character described, a rotatable shaft, fluid actuated pistons, a connecting rod coupling said pistons and having a yoke intermediate its ends, said shaft having a crank extending through said yoke, a slack motion device loose upon the crank and extending through the yoke, and means acting upon the slack motion device for positively adjusting the same longitudinally of the shaft through the yoke and varying the amount of slack motion.

6. In a meter of the character described, a rotatable shaft, fluid actuated pistons, a connecting rod coupling said pistons and having a yoke between its ends engaged about the shaft, a slack motion device loose upon the shaft and extending through the yoke, and means acting upon the slack motion device for effecting adjustment thereof longitudinally of the shaft through the yoke to vary the amount of slack motion and supporting the slack motion device in an adjusted position.

7. In a meter of the character described, a rotatable shaft having a crank, fluid actuated pistons, a connecting rod coupling said pistons and having a yoke between its ends engaged about the crank of said shaft, a slack motion device loose upon the crank and extending through said yoke, means directly engaging the slack motion device for adjusting the slack motion device longitudinally of the crank through the yoke and supporting the same in an adjusted position to vary the amount of slack motion, and means for releasably securing the last mentioned means in a set position.

DONALD H. McGOGY. [L. S.]